United States Patent [19]
Warzel

[11] Patent Number: 4,588,478
[45] Date of Patent: May 13, 1986

[54] APPARATUS FOR SOLAR RETORTING OF OIL SHALE
[75] Inventor: F. Morgan Warzel, Bartlesville, Okla.
[73] Assignee: Phillips Petroleum Company, Bartlesville, Okla.
[21] Appl. No.: 532,433
[22] Filed: Sep. 15, 1983
[51] Int. Cl.[4] .............................................. C10B 1/04
[52] U.S. Cl. ................... 202/99; 48/DIG. 9; 126/451; 202/120
[58] Field of Search .................. 202/99, 120; 201/31, 201/34; 48/DIG. 9; 126/417, 451; 208/11 R, 8 R; 203/DIG. 1

[56] References Cited
U.S. PATENT DOCUMENTS 2,026,923 1/1936 Warner ............................ 201/34
3,993,458 11/1976 Antal, Jr. ...................... 48/DIG. 9
4,087,347 5/1978 Langlois et al. .................. 201/34
4,290,779 9/1981 Frosch .......................... 48/DIG. 9
4,382,850 5/1983 Gregg .

OTHER PUBLICATIONS

*Acurex Solar Corporation Report*, "Solar Oil Shale Retorting".
Gregg et al., *Solar Retorting of Oil Shale*, Lawrence Livermore Laboratory, May 15, 1980, Publication UCRL-52930.
McCabe & Smith, *Unit Operations of Chemical Engineering*, p. 270, (McGraw-Hill, 1976).

*Primary Examiner*—Peter Kratz
*Attorney, Agent, or Firm*—Lyell H. Carver

[57] ABSTRACT

An apparatus for a process for solar retorting of oil shale which comprises pyrolyzing fluidized ground oil shale particles by solar radiation in a retort, wherein said ground oil shale particles are provided in a state of continuous fluidization entrained in a gas and exposed to solar radiation focused through a transparent window, and retorted shale oil fines, gases, and shale oil are removed from the retort to separation and recovery.

3 Claims, 3 Drawing Figures

APPARATUS FOR SOLAR RETORTING OF OIL SHALE

FIELD OF THE INVENTION

The invention pertains to a process and apparatus for the retorting of oil shale through the use of solar energy.

BACKGROUND OF THE INVENTION

Oil shale is the colloquial term for a wide variety of laminated sedimentary rocks containing organic matter that can be released predominantly only by destructive distillation. While some removal of organic matter by solvents is possible, the amount so removed is quite small unless supercritical extractions are employed. This characteristic permits clear distinction from tar sands which are rock or sand formations actually impregnated with oil.

While oil shales have been utilized as a source of fuel for centuries, such uses have generally been small, and the great potential for the huge deposits in various locations around the world remains to be unlocked on a feasible commercial scale.

Oil shales generally contain over one-third mineral matter. The organic portion, a mixture of complex chemical compounds, has been termed "kerogen". Kerogen is simply a generic name for the organic material found in such circumstances, but it is not a definite material since kerogen compositions differ when derived from differing shales.

Destructive pyrolysis of crushed oil shale yields shale oil, a dark, fairly viscous organic liquid. Under the pyrolysis conditions commonly employed, a disproportionation of carbon and hydrogen structures equivalent to internal hydrogenation-dehydrogenation is believed to occur. A large percentage of the kerogen converts to a liquid (the shale oil), some to light gases, and the rest remains as a carbon-rich residue on the inorganic matrix.

Shale oil in some respects may be considered as intermediate in composition between petroleum and coal tar, comparing for example the H:C atomic ratio of about 18:10 for light crude oil, about 15:10 for shale oil, and about 13:10 for coal carbonization products. Shale oil, of course, is not "crude oil" in the strict sense, though refining steps for the shale oil are similar to the refining steps applied to petroleum crudes.

Retorting of ground oil shale fines using heat obtained from radiant solar energy through mirror arrangements has been employed in recent years experimentally. The basic apparatus arrangement so far employed has comprised a large mirror collector producing a converging beam of light directed to and through a transparent "window" aperture opening into a retort chamber to provide a contacting zone wherein the oil shale fines are exposed to the concentrated thermal energy at the focal zone of the solar beam, thus resulting in heating of the oil shale.

The oil shale takes up heat from the concentrated thermal energy, converting to a large extent the kerogen, and producing oil vapors which then are drawn off into a collector system. The spent shale is transferred to another collection chamber. Depending on the time of exposure and the amount of thermal energy employed per unit measure of oil shale, there may be varying amounts of residual carbon or carbonaceous residue left in the oil shale.

Problems encountered in solar retorting of oil shale include keeping the transparent window clean and free of energy-absorbing energy-robbing deposits. Any reduction of effective energy transfer results in immediate dropoff in heat in the oil shale, and loss of process effectiveness and efficiency. Further problems have been encountered in heating large quantities of ground oil shale fines, not just simply a thin layer on the surface of a deep bed which is inefficient and may result in undesirable decomposition products and inadequate conversions of kerogen to shale oil. Other problems have been encountered in avoiding the absorption of radiant energy by smoke and/or mist arising from the oil shale being retorted, which results in further heating and degrading of the smoke and/or oil mist rather than desired heating of oil shale itself.

OBJECTS OF THE INVENTION

It is an object of my invention to provide apparatus effective for the solar retorting of oil shale.

It is a further object of my invention to provide an improved process for the retorting of oil shale using solar-derived thermal energy.

Other objects of my invention will become apparent to one skilled in the art from a reading of my specification and claims.

BRIEF DESCRIPTION OF THE INVENTION

In accordance with my invention, I provide a process and a configuration of apparatus for irradiating ground oil shale which to a large measure overcome the problems I have described.

I have discovered a process for solar retorting of oil shale which comprises pyrolyzing fluidized ground oil shale particles by solar radiation in a retort, in which ground oil shale particles are provided in a state of continuous admixture in a gas and are exposed to solar radiation focused through a transparent window; and retorted shale oil fines, gases, and shale oil are removed from the retort to separation and recovery.

In the apparatus and process of my invention, a flow of generally fluidized oil shale particles is presented to a window through which solar radiation is focused into a focal zone or area for pyrolyzing the ground oil shale particles.

The oil shale particles are exposed to solar radiation while maintained in a state of continuous entrainment or suspension in a gas. Continuous fluidization or suspension is attained when the velocity of the gas is high enough so that solid particles contacted by the gas become substantially entrained in it, as described by W. C. McCabe and J. C. Smith in *Unit Operations of Chemical Engineering* McGraw-Hill, New York, 1956), p. 270.

Reflected sunlight is directed into one or more sides of a continuously replenished agitated bed of ground oil shale fines. Agitation is obtained by the flow of appropriate gases into the bed. The fluidized material is in direct contact with the transparent vessel window or windows through which the radiant solar energy is transmitted into the bed. The rate of replenishment of oil shale particles is adjusted according to the intensity of the absorbed sunlight so as to achieve the desired temperature for pyrolysis of the ground oil shale. Spent shale solids are withdrawn, preferably continuously, from the bed at appropriate locations. Gases and shale oil volatiles are withdrawn from above the bed. This embodiment of my invention is shown in more detail in FIG. 1.

In another aspect of my invention, reflected sunlight is directed generally downwardly into a continuously replenished falling column of ground oil shale fines entrained in a suitable gas. The rate of replenishment and the density of the particles per cubic foot of effectively irradiated volume should be adjusted to achieve the desired retorting temperatures, according to the intensity of the sunlight. The fallen retorted now-spent shale, gases, shale oil, etc., are withdrawn from the bottom of the column. This is illustrated in my FIG. 2.

An aspect which is a variation of that shown in FIG. 2 is shown in FIG. 3 wherein an internal truncated cone 33 configuration for the reactor retor 24 is illustrated. The apex 34 of the truncated cone 33 substantially surrounds the focus zone 28, helping control initial positioning of the oil shale fines in the focus zone, and permitting the gas velocity to decrease sharply therefrom as the cross-sectional area between the diverging sides constantly incrases downwardly, permitting easier separation of spent particles from the products.

Figure 1:
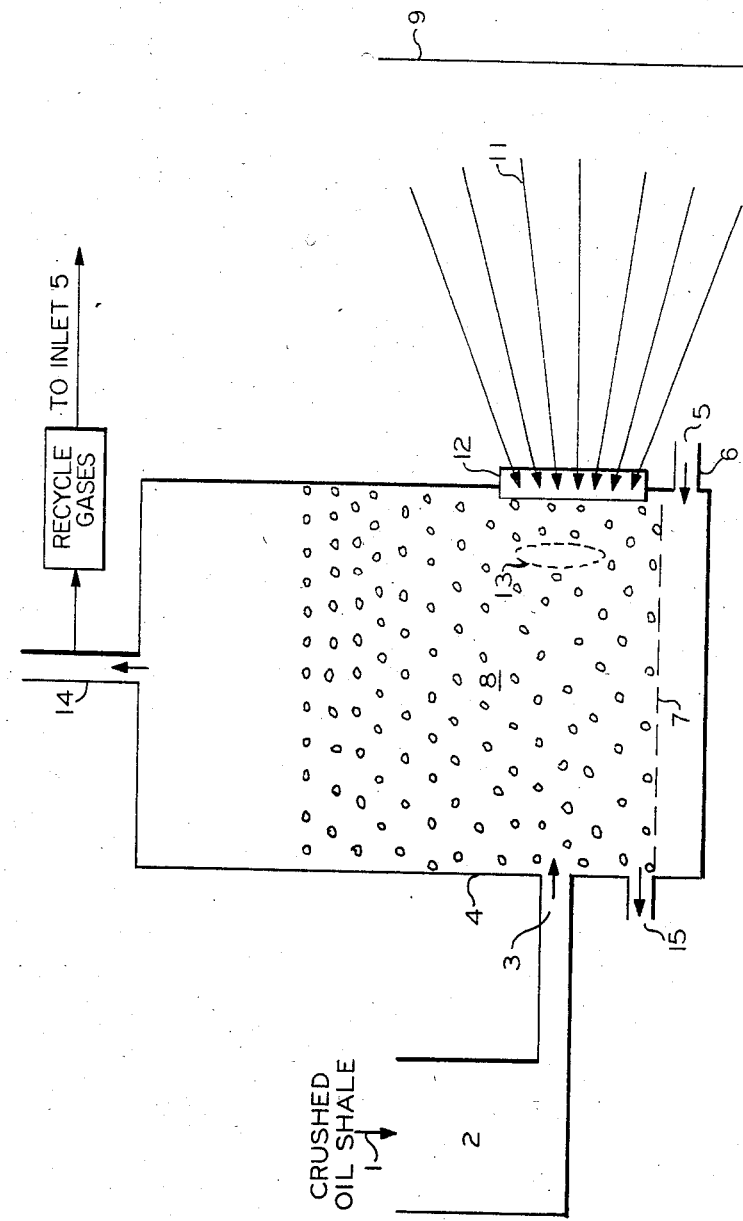
FIG. 1

Crushed oil shale 1, which can be handled and fed via a surge hopper 2, is fed through entrance port 3 into a vertically elongated retort 4 along with sufficient fluidizing gas 5, introduced through inlet port 6 below the support grid 7, to maintain the resulting bed 8 in a substantially fluidized condition. A focusing mirror array 9 produces a converging solar beam 11 which enters the retort 3 via a transparent window 12. On a broad focal area or zone 13 a short distance inside the retort from the transparent window the solar beam provides thermal energy (heat) for the fluidized bed of particulate oil shale. The heated particulate oil shale thereby is pyrolyzed by the heat, converting the kerogen to shale oil and gaseous products. From outlet port at the top 14 of reactor 4 are removed retorted spent shale fines, gases including both product gases as well as exiting fluidizing gases, and shale oil, for transportation to separation and recovery (not shown). Any larger particles of spent shale which may tend to fall to the bottom of reactor 8 can be removed 15 from the side of the fluidized bed.

FIG. 2

Figure 2:
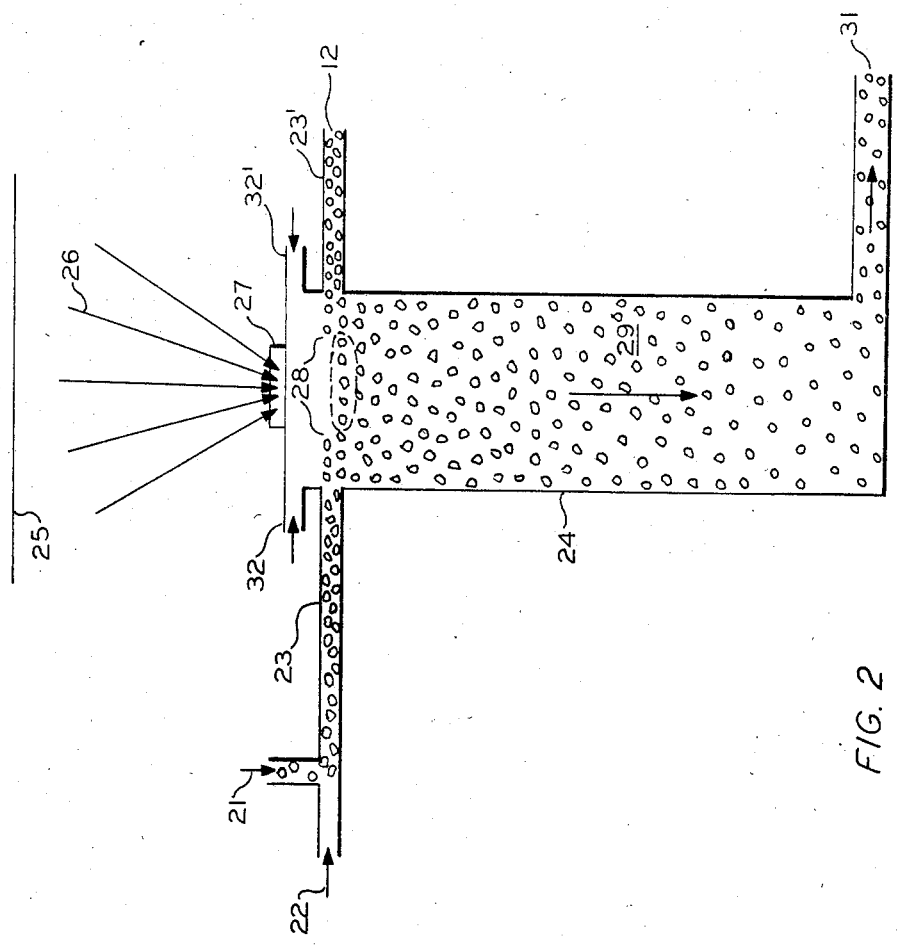

FIG. 2 illustrates my invention in another aspect employing a vertical solar retort to provide intimate contact of finely divided ground oil shale with a solar beam of thermal energy. Ground oil shale 21 is conveyed by gaseous 22 transport into inlet port 23, preferably multiple ports 23 and 23', into the retort 24. Ground particulate oil shale and dispersing or sweep gases preferably are introduced at several points around the periphery of retort column 24. A focusing mirror array 25 produces a converging solar beam 26 which enters the retort 24 through a transparent window 27. Effectively, the sweep gases 22 convey the ground oil shale into the focal area or zone 28 of the beam where the solar-derived thermal energy effectively rapidly heats the ground particulate oil shale to a suitably high temperature. The now very hot oil shale 29 falls generally downwardly through the retort entrained in the transport gases and product gases and shale oil mist. The particles largely fall by gravity since the gas velocities will be much less in the retort body than the velocities employed in transport through 23 and 23'. The total materials are removed through an outlet conduit 31 or conduits in the lower area. The spent shale particles, product gases, gases from recycle, and shale oil products, are transported to separation and recovery (not shown). Preferably, a sweep gas introduced through lines 32 and 32', flows past window 27 and helps to prevent buildup of oil and other deposits on the inside of window 27. The sweep gas exits through line 31.

FIGURE 3

Figure 3:
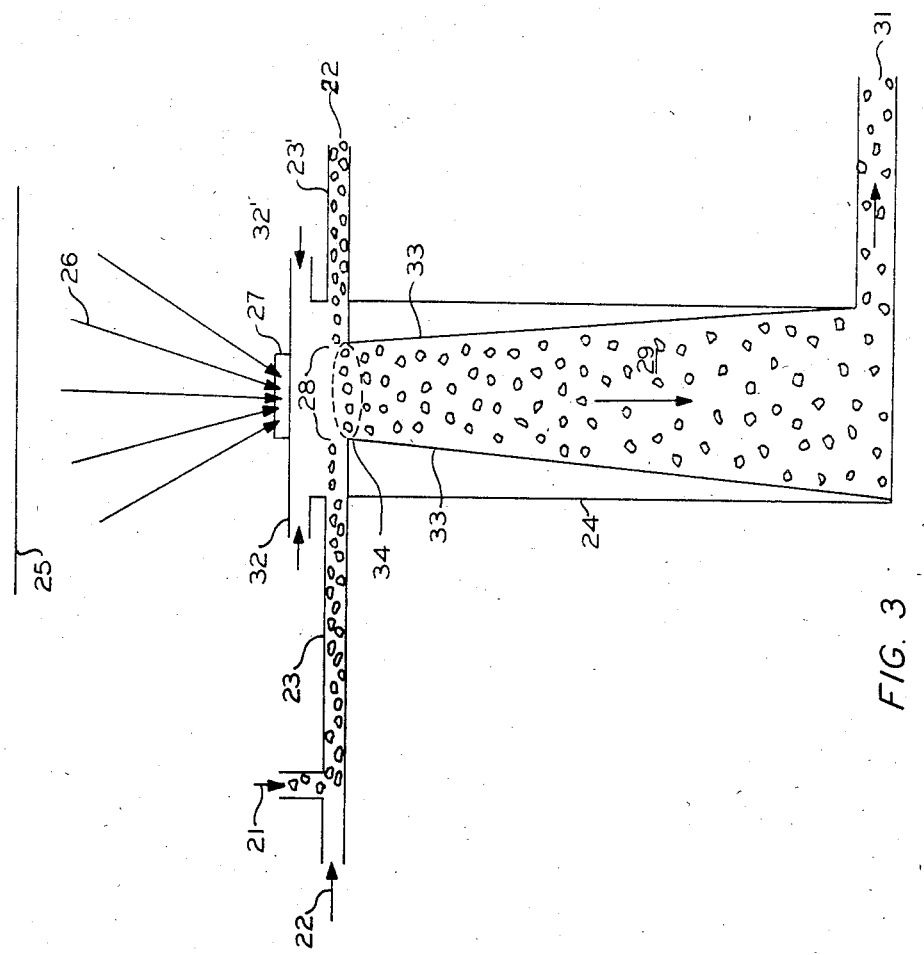

FIG. 3 illustrates my invention in an aspect which is a variation of FIG. 2. Instead of a straight walled retort interior 24 as shown in FIG. 2, a truncated cone 33 interior is shown in FIG. 3. The internal truncated cone configuration 33 provides an apex 34 substantially surrounding the focus zone 28. This configuration 34, 33, helps control initial positioning of the oil shale fines 22 within the focus zone 28. The gas velocity decreases sharply therefrom as the cross-sectional area between the diverging sides 33, 33 constantly increases as the particle 29 fall downwardly. Such a configuration permits easier separation of spent particles from the products.

DETAILED DESCRIPTION OF THE INVENTION

The oil shale should be ground to a small particle size, such as of about 7 to 100 mesh, preferably about 8 to 35 mesh. The oil shale can be ground by means of any suitable mill, such as a roll mill.

In accordance with my process, I provide a continuously moving stream of finely divided ground oil shale in admixture with a carrier gas into the focal zone of a collected beam of solar energy. The particulate oil shale is heated to a temperature of about 480° C. to 800° C., depending on the total energy exposure and absorption and the time of exposure of the particles of oil shale. In general, the higher the heating rate, the higher the oil yield. Increased oil yield means decreased amounts of char or carbonaceous residuals in the spent shale. With solar oil-shale retorting and with very small diameter average oil shale particles, very high heating rates are achievable, providing that the adequate amount of solar energy reaches the particles, and the "window" is maintained in a substantially clean condition.

A. Fluidized Bed Retort

The fluidized bed retort described in FIG. 1 can be of any suitable shape: circular, triangular, rectangular, square, etc., though presently preferably rectangular or square where side windows are employed so as to permit the installation of one or more flat windows. Flat windows in cylindrical retorts would leave dead spaces; curved windows are relatively expensive. The fluidized bed is supported by a grid such as a metal screen, perforated metal plate, or perforated ceramic plate.

The fluidizing gas can be any inert or hydrocarbon gas or gas mixture, preferably of low heat capacity. Although of not particularly low heat capacity, the gases produced in the retort and separated from spent shale fines and shale oil is available and conveniently can be used.

The retort dimensions and proportions are not believed to be critical. Generally the height of the retort is greater than its width. The size of the retort, of course, depends on the oil shale throughput and the desired residence time. There must be sufficient free space (freeboard) above the top of the fluidized bed to allow disengagement of the volatiles (oils and gases) and fall-back of the spent shale particles.

While my FIG. 1 shows a single entrance port for crushed oil shale 3, and a single inlet for fluidizing gases inlet 5, certainly multiple inlets of either or both are feasible and can be preferred in larger units, particularly where multiple windows are positioned.

Generally the heat requirement for retorting one short ton (2000 lb.) of shale oil is about 600,000 BTU. Since the peak sunlight insolation during a sunny day generally is about 1 KW/mz/m$^2$=3,400 Btu/mz$^2$-hr, a retorting operation for processing about one ton/hr. of shale oil would require about 175 m$^2$ of focusing mirrors (e.g., concave mirrors, not shown in FIG. 1) that direct reflected sunlight through the window or windows (plane or convex) into the retort so as to attain an effective retort temperature, such as of about 900° to 1200° F. The oil shale receiving sunlight must be replaced quickly enough to not be overheated, to minimize carbonate decomposition.

There would be a "focal point" in the sense that all the presumed individual reflecting concentrating mirrors per window would direct sunlight at one point relative to that window. In theory, such a "point" should be in the retort a short distance opposite the inner surface of the center of the window. This would minimize window size or conversely allow for maximum mirrors for a given window size. From the standpoint of heating the shale, all that counts is that the energy get through the window. In practice, the solar beam energy is substantially absorbed within a quite short distance inside the window, such as within 1 to 5 or 10 mm, due to the particles encountering the beam. The reason for having a focal zone a short distance inside the retort is to achieve a uniform radiation flux over substantially the entire window area. This would not be achieved if all sunlight were focused sharply precisely on the inside surface of the window. In practice, the mirrors are adjusted to focus into a focus zone or area just inside of and away from the window.

Spent shale fines, product oil mist and vapors, and gases exit through the top of the retort, as is shown in FIG. 1, and are taken to separation. Entrained fines can be separated such as by passing the off-gases through a cyclone to remove small amounts of entrained shale fines. Generally, partial condensation and distillation can accomplish separation of the remaining mixture into gases, partially recycled to the retort as fluidizing gases, and product oil.

The bulk of spent shale is removed through conduits just above the fluid bed support grid by means of mechanical or pneumatic conveyor means known by those skilled in the art. Generally no carbon burnoff is required if the solar fluidized bed retort is operated at optimal insolation and heating conditions.

Windows

One or more windows, which generally are flat but may be convexly shaped, made of quartz or heat-resistant glass such as borosilicate glass, are installed in one or more appropriate locations of the retort. A fluidized bed of oil shale particles is maintained by the input of ground oil shale and fluidizing gas at optimized feed rates. The fluidized bed is agitated by the turbulent flow of gases from below. The agitated bed effectively continuously scours the window or windows, keeps them free of energy-absorbing (energy robbing) fouling deposits, and at the same time conveys energy-absorbing (energy-robbing) smoke, which might form between windows and oil shale particles, upwardly and away from the windows. The process continuously exposes different material particles to the radiant energy and provides a uniform temperature of the entire body of solids within the retort assuring that no excessive coking occurs and that essentially all oil shale particles are pyrolyzed.

B. Falling Bed Retort

In accordance with the falling bed aspect of my invention, as illustrated by FIGS. 2, and 3 ground oil shale particles are conveyed pneumatically through multiple entrance ports around the periphery of the upper area of the falling column (falling bed) retort. Entry can be squarely into the retort, that is, at about 90° relative to the vertical axis of the falling bed retort, or can employ tangential entry ports for the gases/particles around the retort, to provide a more uniform contact of radiation with all of the particles and greater agitation by a swirling falling action. The entraining (conveying) gases can be any inert or hydrocarbon gas, preferably of low heat capacity. Conveniently, the available recycled, cleaned (of fines) product gas of the retorting operation can be employed. The velocity of the entraining gas should be sufficiently high enough so as to cause the entrained oil shale particles to pneumatically disperse substantially across the entire solar focus zone or area in the upper portion of the retort so as to be as fully exposed as possible to the solar radiation focused through the window positioned in the top of the retort. The fact that the oil shale particles entrained in the conveying gases are continuously falling through the focal zone past the windows helps keep the windows from being fouled by oil and carbonaceous deposits (see FIGS. 2 and 3). The oil shale particles falling through the zone absorb enough solar radiation to attain a temperature of about 900°-1200° F. in the retort. This temperature is generally adequate to afford distinctive distillative conversion of kerogen from the oil shale. Generally, for oil shale particles of about 8 to 35 mesh, the amount of entraining gas will be about 5 to 20 cubic feet per lb. of solids.

The sunlight should not be focused at a point but over a concentrated "focus area" or zone comprising in so far as practicable substantially the entire cross-section of the retort. The falling shale has only "one chance" to be irradiated (heated) by the sunlight, and that is while it is at or very near the top of the falling column. As illustrated in FIG. 2, the "bed" of particles may be somewhat dish-shaped, to a greater or lesser extent, depending on velocities of gas and particles, and dimensions of the "bed".

Because of potentially undesirable carbonate decomposition in western oil shale, one does not want to overheat a portion of the shale and then anticipate that through conduction and mixing that the whole body of the shale will reach retorting temperature. Carbonate decomposition soaks up heat (is endothermic) and produces $CO_2$ which is a diluent gas, both effects being undesirable. Eastern oil shale does not contain significant carbonates.

Retorted shale particles, and product oil and gases are carried downwardly by the gases and the influence of gravity. The gas pressure is high enough to allow the entire dispersed mass (conveying and sweep gases, product gases, product oil, and spent shale particles) to exit freely through the exit conduit near the bottom of the retort to be taken to recovery and separation operation. Entrained shale fines can be separated from gases by such as cyclone separation. Distillation can be employed as may be suitable.

The diameter to height ratio of the falling bed retort, which can be circular, square, rectangular, etc., can vary considerably. Generally the height to width ratio ranges from about 10:1 to 20:1. An internal truncated cone apparatus configuration as shown in FIG. 3) can be used, if desired. The apex substantially surrounds the focus zone. This configuration helps control initial positioning of the oil shale fines in the focus zone. The gas velocity decreases sharply therefrom as the cross-sectional area between the diverging sides constantly increases. Such a configuration permits easier separation of spent particles from the products.

Residual Carbon Burnoff

If there is much residue carbon on the spent particles from either method of retorting, the carbonaceous shale particles can be transferred to a furnace where residue-carbon can be burned off to provide some heat and gaseous products, such as carbon monoxide and carbon dioxide. If there is little or no residue-carbon, then the spent shale can be taken to dump.

If desired, the products from either retorting process can be conveyed to a heat soak interval means, often beneficial in shale oil recovery, and particularly useful where an external or supplementary heat source is available.

Calculated Examples

The following calculated examples and material balances are designed to illustrate the two major aspects of my invention. These are intended to assist in illustrating the invention, and are not intended to unduly limit the scope of my invention.

EXAMPLE I

The operation of a fluidized bed retort is illustrated in this calculated example. 100 (short) tons (200,000 lb) of ground Western oil shale (Fischer assay of 30 gallons per short ton, GPT) per hour are retorted. The average residence time in the retort is about 4 minutes. The heat requirement for retorting 1 ton (2000 lb) is about 600,000 Btu. The peak solar insolation on a sunny day is about 1 KW/m$^2$, which is equal to about 3,400 Btu/m$^2$.

Choosing an expanded, fluidized bed density of about 100 lbs/ft$^3$ for illustrative purposes, the fluidized bed volume is about 133 ft$^3$.

The vertical retort has a square cross-section, of about 4 ft×4 ft, and a total bed height of about 8.3 ft. The disengaging portion above the fluidized bed is about 4 ft, and above that is allowed on the order of about 0.7 ft for the height of the gas inlet region below the support grid. Therefore, the entire height of the retort is about 13 ft. Thus, for ratio purposes, the bed height:retort height is about 8.3:13 or 1:1.56. Of course, the disengaging zone can be higher, and the gas inlet region depth can be greater, if desired.

For exemplary purposes, one window of about 3 ft wide and 6 ft high is installed. The total area of focusing mirrors to direct solar radiation at peak insolation through the mirror is about 17,600 m$^2$. Preferably the mirrors are tracking mirrors that slowly follow the apparent movement of the sun so to maintain as near-peak solar radiation as possible focused through the window for a maximum number of hours per day.

EXAMPLE II

This calculated example illustrates the operation of a falling bed retort of a generally round (circular) configuration having a window area of about 78 ft$^2$. The throughput is 100 (short) tons per hour of Western (Fischer assay 30 GPT) oil shale. About 43,000 ft$^3$/minute of recycle gas is introduced with the ground shale as the fluidizing (conveying) sweep gas to provide dispersing of the oil shale particles in the focus zone of the window. The retort has a diameter of about 10 ft and a vertical height of about 100 ft, a ratio of about 1:10, though this can be varied depending on desired rates of throughput. The diameter of the tubular exit conduit is about 3 ft.

The disclosure, including exemplary data, illustrates the value and effectiveness of my invention. The examples, the knowledge and background of the field of the invention and the principles of applicable sciences form the bases from which the descriptions of my invention have been developed, and form the bases for my claims here appended.

I claim:

1. An apparatus for solar retorting of oil shale, which comprises, in operable conjunction, means for bringing ground oil shale particles within the focal zone of at least one beam of solar radiation derived from a focusing mirror array means, a shell, said shell defining therewithin a generally closed retort having a top portion, a bottom portion, and a side portion therebetween and having upper and lower side portions; transparent window means positioned in said lower side portion, inlet means positioned in said side portion and arranged for receiving oil shale particles, inlet means in said side portion and arranged for receiving fluidizing gases and positined below said oil shale particle inlet means, and means for admixing said oil shale particles and said fluidizing gases;

focusing array means arranged for receiving solar radiation positioned outside of said shell and arranged to collect and transmit solar radiation to said transparent window means to a focal zone just within said retort, said transparent window means positioned in said lower side portion of said shell and arranged to receive said solar radiation;

said retort defining a volume wherein contacting of said oil shale particles and said solar radiation occurs within said focal zone resulting in heating said particles, and a retorting volume wherein said heated particles are retorted to fines, shall oil, and product gases;

said apparatus defining a fluidized particle bed reactor means, said inlet means for oil shale particles and said inlet means for said fluidizing gases positioned in said lower side portion of said shell in operable conjunction with and below said inlet means for shale particles to provide fluidization of said particles by said fluidizing gases, whereby said oil shale particles are presented into said focal zone of said solar radiation in said lower side portion of said shell; and means to remove said fines, gases, and shale oil from said retort.

2. The apparatus of claim 1 including means to recycle product gases as fluidizing gases.

3. The apparatus of claim 2 wherein said fluidized bed retort means incorporates multiple inlet means for at least one of said fluidizing gases and said particulate oil shale.

* * * * *